(12) United States Patent
Lee

(10) Patent No.: US 12,284,435 B2
(45) Date of Patent: Apr. 22, 2025

(54) ELECTRONIC DEVICE AND SERVER FOR DETERMINING USER'S POSITION-RELATED INFORMATION

(71) Applicant: Samsung Electronics Co., Ltd., Suwon-si (KR)

(72) Inventor: Jaemyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 18/183,559

(22) Filed: Mar. 14, 2023

(65) Prior Publication Data

US 2023/0224577 A1  Jul. 13, 2023

Related U.S. Application Data

(63) Continuation of application No. PCT/KR2021/012520, filed on Sep. 14, 2021.

(30) Foreign Application Priority Data

Sep. 17, 2020  (KR) .......................... 10-2020-0119700

(51) Int. Cl.
*H04N 23/60* (2023.01)
*G01C 21/30* (2006.01)
(Continued)

(52) U.S. Cl.
CPC ............. *H04N 23/64* (2023.01); *G01C 21/30* (2013.01); *G06T 7/74* (2017.01); *H04N 23/61* (2023.01);
(Continued)

(58) Field of Classification Search
CPC ...... H04N 23/64; H04N 23/61; H04N 23/633; G01C 21/30; G06T 7/74;
(Continued)

(56) References Cited

U.S. PATENT DOCUMENTS 9,208,389 B2   12/2015  Sung et al.
10,616,478 B2   4/2020  Jung et al.
(Continued)

FOREIGN PATENT DOCUMENTS

KR   10-2006-0056580 A   5/2006
KR   10-2010-0041926 A   4/2010
(Continued)

OTHER PUBLICATIONS

Jun-Hyuck Im et al., 3D LIDAR based Precise Vehicle Localization Using Vertical Structure Landmarks in an Urban Area, Journal of Institute of Control, Robotics and Systems 23(12), 1116-1125, Dec. 2017.

(Continued)

*Primary Examiner* — Usman A Khan
(74) *Attorney, Agent, or Firm* — Jefferson IP Law, LLP

(57) ABSTRACT

An electronic device is provided. The electronic device includes a camera, a display, a memory, a location positioning circuitry, and at least one processor operatively coupled to the camera, the display, the memory, and the location positioning circuitry, wherein the at least one processor may determine a first position and a first direction of a user through the location positioning circuitry, obtain surrounding information about the first position from a map database, generate scan request information including a reference target from the map database on the basis of the surrounding information, display a capture guide on the display such that a capture target corresponding to the reference target is captured with the camera by using the scan request information, determine a second position and a second direction by using the capture target and the reference target, and display the second position and the second direction on the display.

14 Claims, 12 Drawing Sheets

(51) Int. Cl.
*G06T 7/73* (2017.01)
*H04N 23/61* (2023.01)
*H04N 23/63* (2023.01)

(52) U.S. Cl.
CPC . *H04N 23/633* (2023.01); *G06T 2207/30184* (2013.01); *G06T 2207/30244* (2013.01)

(58) Field of Classification Search
CPC . G06T 2207/30184; G06T 2207/30244; G01S 19/42
USPC .................................................. 348/333.02
See application file for complete search history.

(56) References Cited

U.S. PATENT DOCUMENTS

| | | | |
|---|---|---|---|
| 2005/0031330 A1* | 2/2005 | Nonaka | G03B 13/36 396/104 |
| 2005/0185060 A1 | 8/2005 | Neven, Sr. | |
| 2012/0105474 A1* | 5/2012 | Cudalbu | G01C 21/3664 701/300 |
| 2018/0202814 A1 | 7/2018 | Kudrynski et al. | |
| 2019/0174056 A1* | 6/2019 | Jung | G06N 3/088 |
| 2021/0134003 A1 | 5/2021 | Hincapie et al. | |
| 2021/0173095 A1 | 6/2021 | Kang | |

FOREIGN PATENT DOCUMENTS

| | | |
|---|---|---|
| KR | 10-2013-0107318 A | 10/2013 |
| KR | 10-2015-0082855 A | 7/2015 |
| KR | 10-2017-0015754 A | 2/2017 |
| KR | 10-1898665 B1 | 9/2018 |
| KR | 10-2019-0064958 A | 6/2019 |
| KR | 10-2020-0012379 A | 2/2020 |

OTHER PUBLICATIONS

International Search Report dated Dec. 16, 2021, issued in International Patent Application No. PCT/KR2021/012520.

* cited by examiner

FIG. 6A
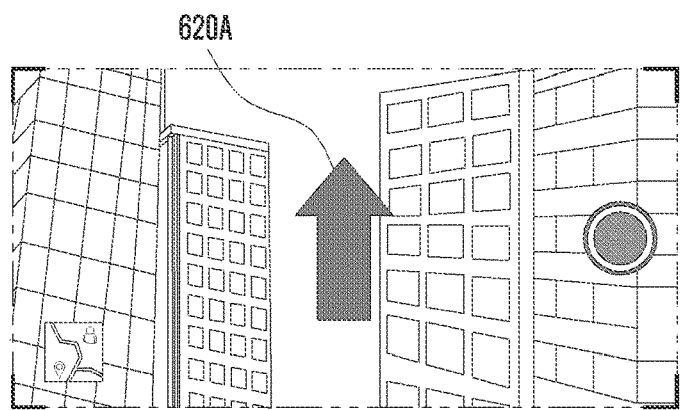
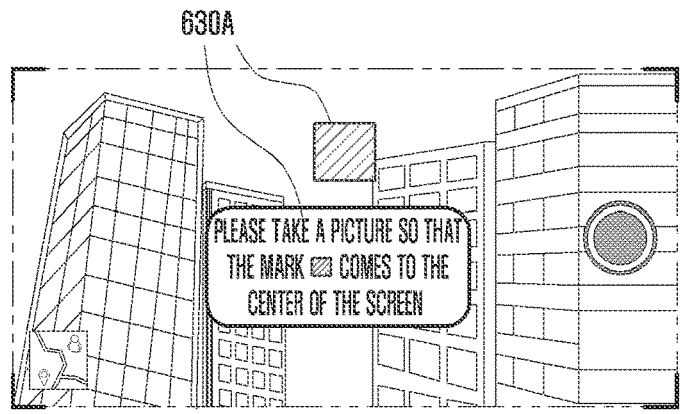
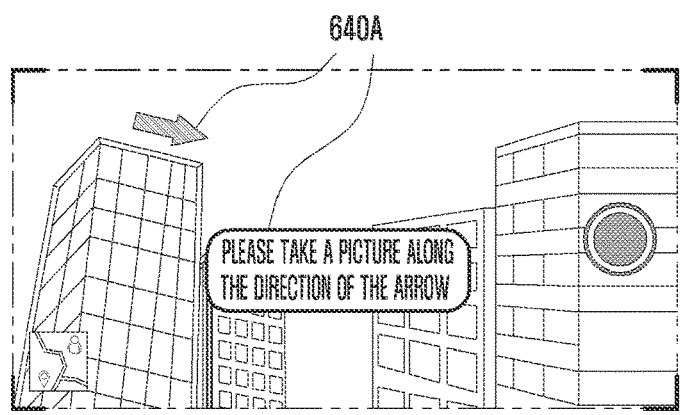

FIG. 6B
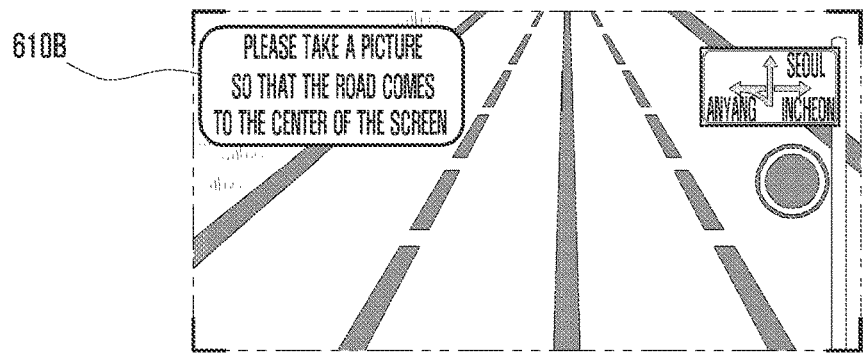
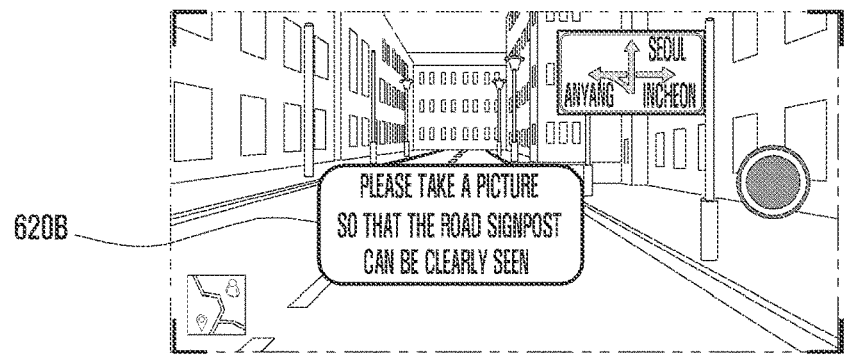
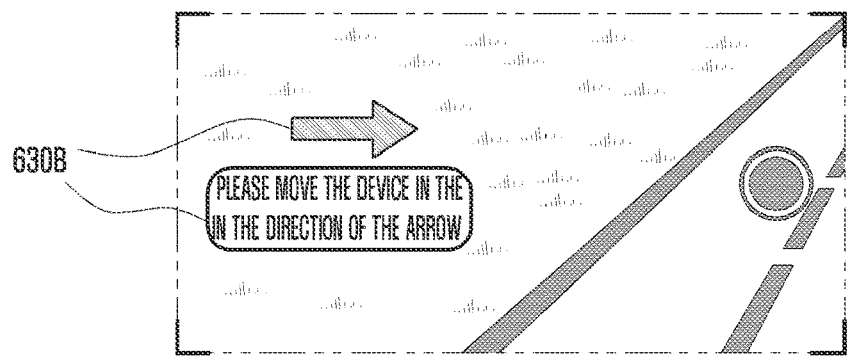
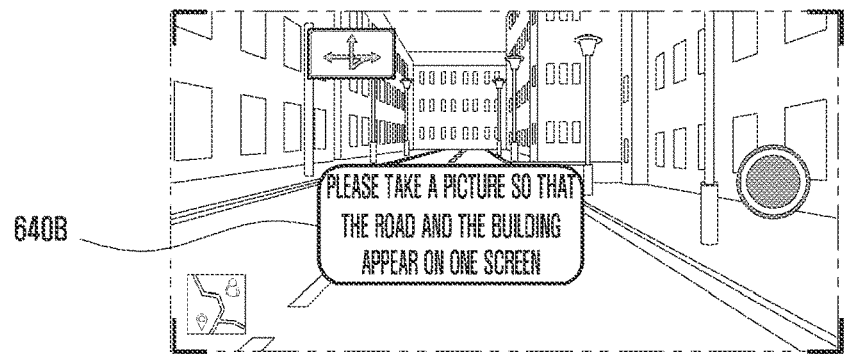

ELECTRONIC DEVICE AND SERVER FOR DETERMINING USER'S POSITION-RELATED INFORMATION

CROSS-REFERENCE TO RELATED APPLICATION(S)

This application is a continuation application, claiming priority under § 365(c), of an International application No. PCT/KR2021/012520, filed on Sep. 14, 2021, which is based on and claims the benefit of a Korean patent application number 10-2020-0119700, filed on Sep. 17, 2020, in the Korean Intellectual Property Office, the disclosure of which is incorporated by reference herein in its entirety.

BACKGROUND

1. Field

The disclosure relates to an electronic device and a server for determining information related to a location of a user.

2. Description of Related Art

There are various methods for measuring the location of a user. A satellite navigation system such as global position system (GPS) can measure a position of an electronic device in cooperation with satellites. Also, a location of an electronic device may be estimated in reverse through the location of a wireless device connected to the electronic device.

As the market demand for location-based services such as augmented reality (AR) increases, the demand for technology capable of more accurately measuring the location and direction of a user is increasing.

The above information is presented as background information only to assist with an understanding of the disclosure. No determination has been made, and no assertion is made, as to whether any of the above might be applicable as prior art with regard to the disclosure.

SUMMARY

Estimating the user's location through a satellite navigation system such as GPS or the location of a wireless communication device may have an error depending on the method used. In addition, it is difficult to accurately measure the user's direction.

To provide location-based services in a smooth manner, it is necessary to accurately measure the location and direction of a user.

Aspects of the disclosure are to address at least the above-mentioned problems and/or disadvantages and to provide at least the advantages described below. Accordingly, an aspect of the disclosure is to provide an electronic device and a server that can more accurately measure the location and direction of a user.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a display, a memory, a location positioning circuitry for measuring the location and direction of the electronic device, and at least one processor operably connected to the camera, display, memory, and location positioning circuitry, wherein the at least one processor may be configured to determine a first place and first direction of a user through the location positioning circuitry, obtain surrounding information about the first place from a map database, generate scan request information including a reference target from the map database based on the surrounding information, display a shooting guide on the display by using the scan request information so that a shooting target corresponding to the reference target is photographed by the camera, determine a second place and second direction by using the shooting target and the reference target, and display the second place and second direction on the display.

In accordance with another aspect of the disclosure, a server is provided. The server includes a server memory, and at least one server processor, wherein the at least one server processor may be configured to receive a first place from an electronic device to obtain surrounding information about the first place from a map database stored in the server memory, generate scan request information including a reference target from the map database based on the surrounding information, transmit the scan request information to the electronic device so as to enable the electronic device to photograph a shooting target corresponding to the reference target by use of the scan request information, receive the shooting target from the electronic device to determine a second place and second direction by using the shooting target and the reference target, and transmit the second place and second direction to the electronic device.

According to various embodiments disclosed in this document, the user's location and direction can be accurately measured. In addition, it is possible to induce the user to easily obtain information necessary for determining the location and direction through a shooting guide.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B, 6C, and 6D are diagrams for illustrating a shooting guide according to various embodiments of the disclosure;

The same reference numerals are used to represent the same elements throughout the drawings.

DETAILED DESCRIPTION

Figure 1:
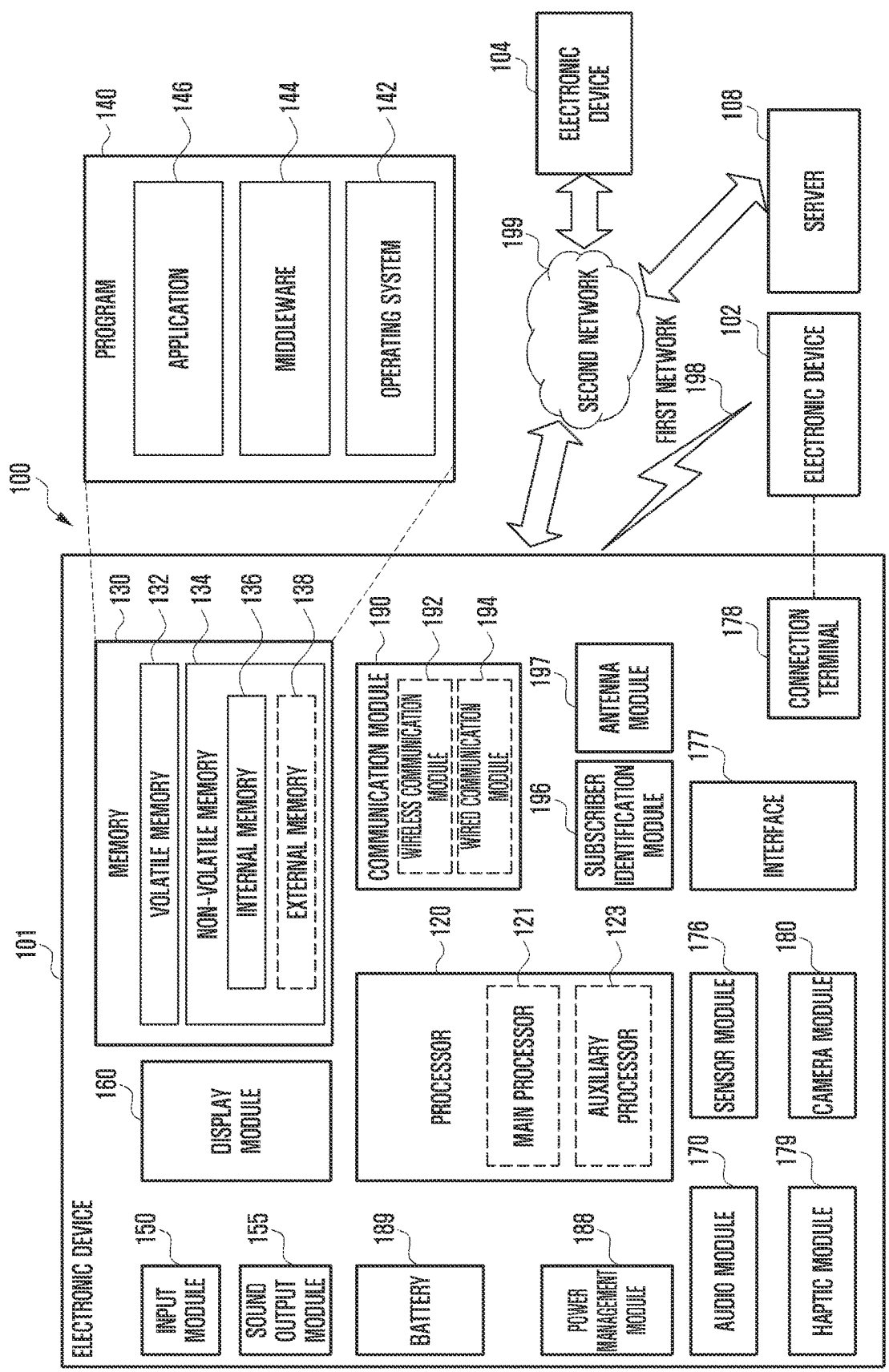
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory 134 may include internal memory 136 and/or external memory 138. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, a communication processor (CP), and the like) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may be configured to control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network, for example, may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. In yet another embodiment, the memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In another embodiment, the input module 150 may include, for example, a microphone, a mouse, a keyboard, a key (e.g., a button), a digital pen (e.g., a stylus pen), and the like.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may be configured to visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to another embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one embodiment, the haptic module 179 may include, for example, a motor, a piezoelectric element, or an electric stimulator.

The camera module 180 may capture a still image or moving images. In another embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. In an embodiment, the communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. In yet another embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may be configured to support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. In an embodiment, another component (e.g., a radio frequency integrated circuit (RFIC)) other than the radiating element may be additionally formed as part of the antenna module 197.

According to some embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
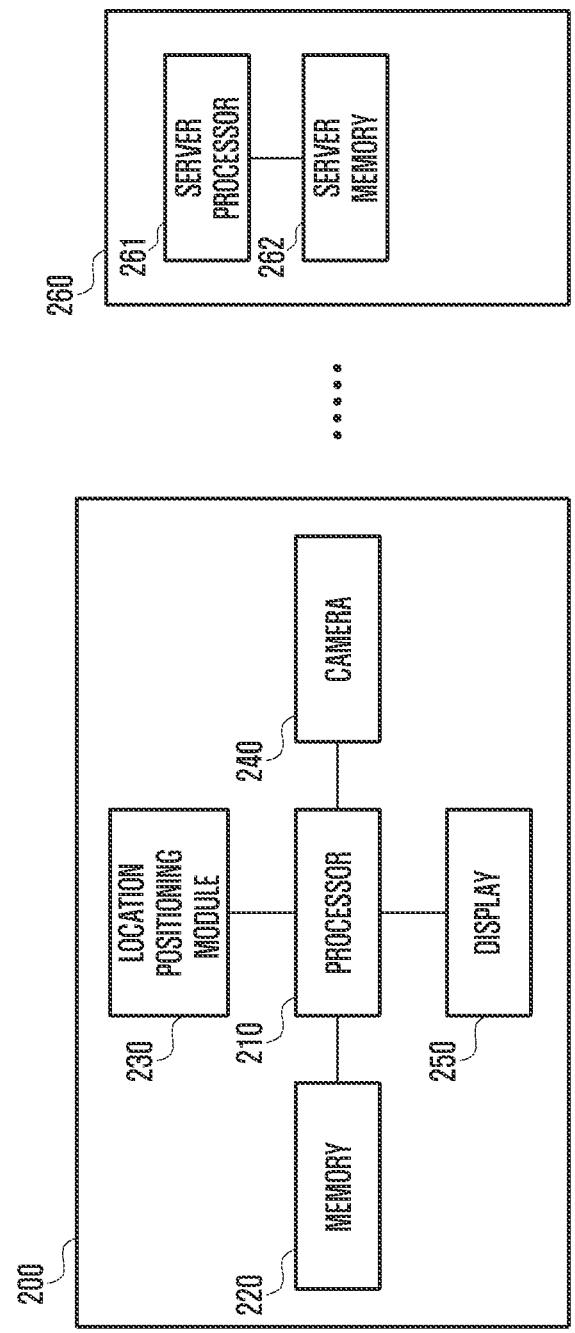
FIG. 2 is a block diagram of an electronic device and a server according to an embodiment of the disclosure.

FIG. 2 is a block diagram of an electronic device and a server according to an embodiment of the disclosure.

Referring to FIG. 2, an electronic device 200 (e.g., an electronic device 101 in FIG. 1) may include a processor 210 (e.g., the processor 120 in FIG. 1 or the auxiliary processor 210 or 123) and various electronic components operably connected to the processor 210. The electronic components may include, for example, a camera 240 (e.g., the camera module 180 in FIG. 1), a display 250 (e.g., the display module 160 in FIG. 1), a memory 220 (e.g., the memory 130 in FIG. 1), and a location positioning module 230 (i.e., location positioning circuitry).

According to some embodiments, the location positioning module 230 may include various equipment capable of measuring the position and direction of the electronic device 200. The direction of the electronic device 200 may be determined based on, for example, a direction in which a specific part of the electronic device 200 faces.

According to other embodiments, the location positioning module 230 may include an equipment capable of implementing a global navigation satellite system (GNSS) that may measure the position of the electronic device 200 through connection with a satellite. The GNSS may be, for example, Global Positioning System (GPS), Beidou Navigation Satellite System (BDS), or European Global Satellite Navigation System (Galileo). As another example, the location positioning module 230 may include an equipment capable of communicating with a base station or access point (AP).

According to yet other embodiments, the location positioning module 230 may include a communication module performing wireless communication (e.g., communication module 190 in FIG. 1). The location of the electronic device 200 may be measured through a communication module that performs wireless communication through connection with a base station or AP. In an example, the location of the electronic device 200 may be measured by using the location of the base station or AP connected to the electronic device 200. Here, the wireless communication may include cellular communication using at least one of, for example, 5G, long-term evolution (LTE), LTE Advanced (LTE-A), code division multiple access (CDMA), wideband CDMA (WCDMA), universal mobile telecommunications system (UMTS), wireless broadband (WiBro), or global system for mobile communications (GSM). In addition, it may include at least one of wireless fidelity (Wi-Fi), Bluetooth, Bluetooth Low Energy (BLE), Zigbee, near field communication (NFC), Magnetic Secure Transmission, radio frequency (RF), or body area network (BAN).

The location positioning module 230 may include a sensor (e.g., sensor module 176 in FIG. 1) capable of measuring the movement of the electronic device 200. The movement of the electronic device 200 may be measured by using an acceleration sensor, a gyro sensor, or a geomagnetic sensor. Using a sensor that measures the movement of the electronic device 200, it is possible to identify in which direction and by how much the electronic device 200 has been moved from the reference position.

According to some embodiments, the electronic device 200 may be connected to the server 260 (e.g., server 108 in FIG. 1). In an embodiment, the server 260 may include a server processor 261 and a server memory 262. A map database may be stored in the server memory 262.

According to other embodiments, the map database may be a database including various map information. The map database may include, for example, three-dimensional (3D) modeling data of various objects (e.g., buildings, roads, signboards, geographical features). Additionally, the map database may include building information such as building coverage ratio and floor area ratio of a building. In response to a request from the electronic device 200, the server 260 may transmit necessary information from the map database stored in the server memory 262 to the electronic device 200. In one embodiment, the electronic device 200 may receive at least a portion of the map database stored in the server memory 262 and store it in the memory 220 of the electronic device 200. When a map database is stored in the memory 220 of the electronic device 200, the electronic device 200 may utilize the map database without communication with the server 260.

The "processor" in the following description may include the processor 210 of the electronic device 200 or the server processor 261 of the server 260 if not clearly referred to as "processor 210 of the electronic device 200" or "server processor 261 of the server 260". Operations such as information processing, modification, comparison, and analysis may be performed by the processor 210 of the electronic device 200 or the server processor 261 of the server 260. In another embodiment, a specific operation may be performed by dividing the information to be processed by the processor into segments and then processing the divided segments separately in the processor 210 of the electronic device 200 and the server processor 261 of the server 260.

In the following description, reference numerals in FIG. 2 are used for configurations shown in FIG. 2.

Figure 3:
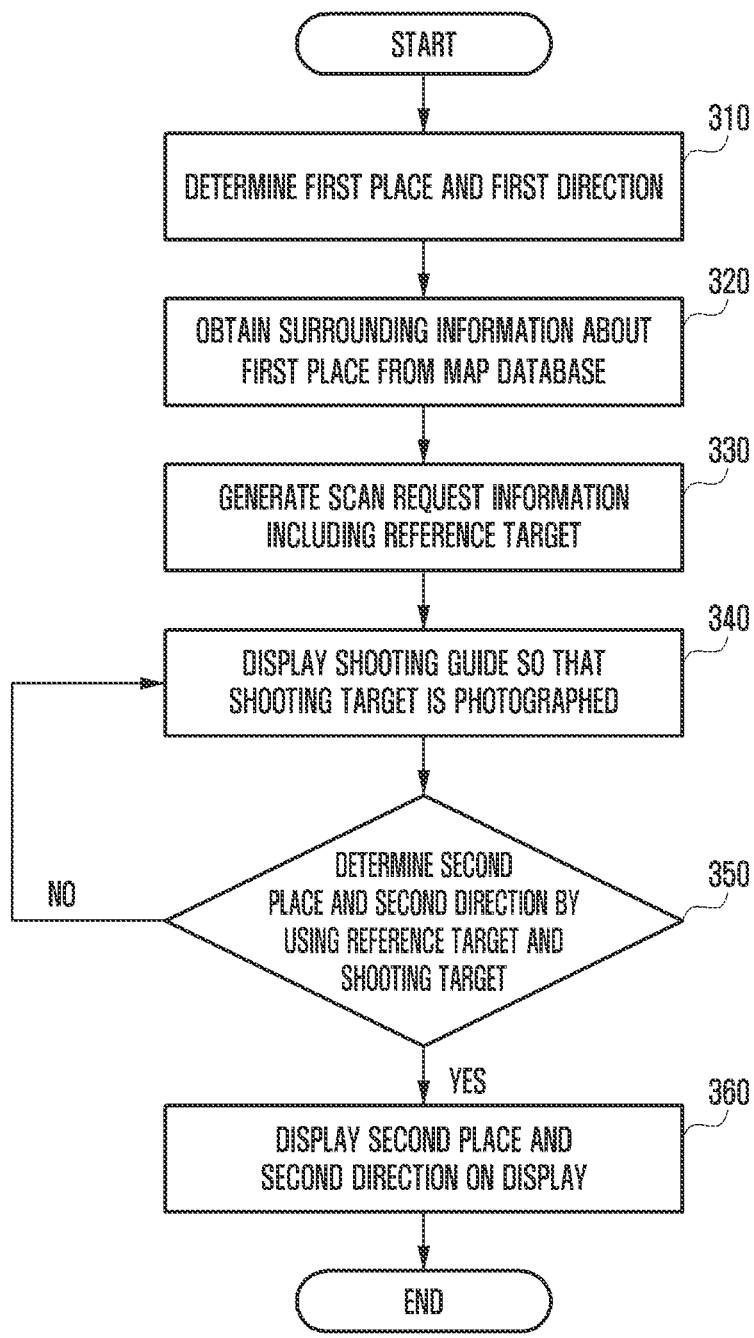
FIG. 3 is a flowchart for determining a location of a user according to an embodiment of the disclosure.

FIG. 3 is a flowchart for determining a location of a user according to an embodiment of the disclosure.

Figure 4:
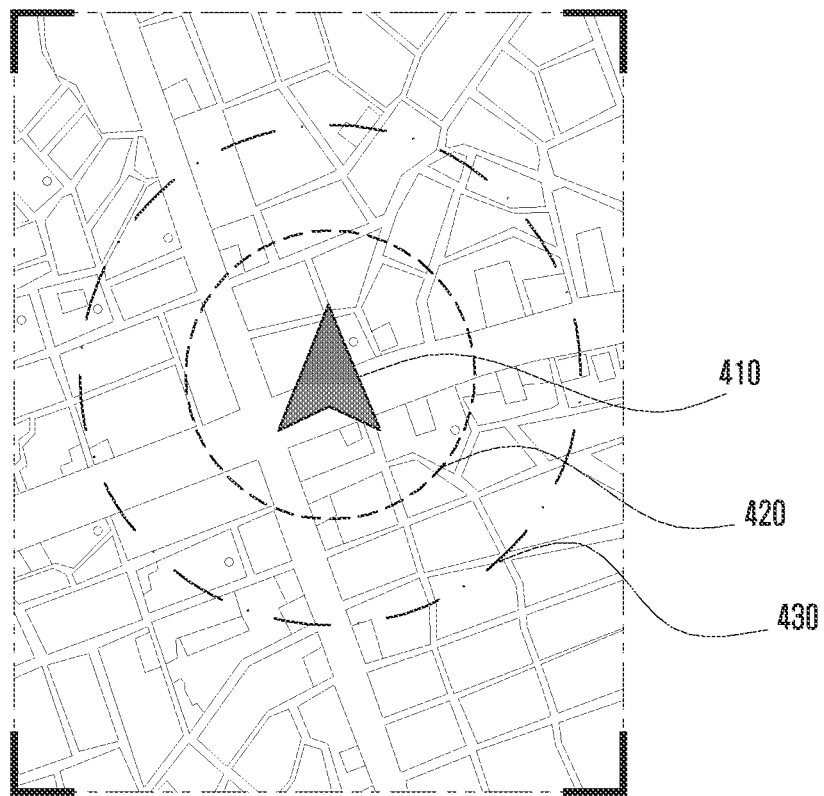
FIG. 4 is a diagram for depicting a first place and a range of the first place according to an embodiment of the disclosure.

FIG. 4 is a diagram for depicting a first place and a range of the first place according to an embodiment of the disclosure.

According to some embodiments, the processor 210 of the electronic device 200 may determine a first place 410 and a first direction of the electronic device 200 by using the location positioning module 230 at operation 310. In an example, the processor may measure the position and direction of the electronic device 200 through the GPS and determine these as the first place 410 and the first direction. The processor may also measure the position and direction of the electronic device 200 through the communication module and determine these as the first place 410 and the first direction. In an embodiment of the disclosure, the processor may determine the reference position and reference direction through the GPS or communication module, measure the movement of the electronic device 200 through a sensor that measures the movement of the electronic device 200, and determine the first place 410 and the first direction by applying the movement of the electronic device 200 to the reference position and reference direction. In addition, the first place and the first direction may be determined in various ways using the location positioning module 230.

According to other embodiments, the processor may obtain surrounding information about the first place from the map database at operation 320. The map database may be stored in the memory 220 of the electronic device 200 or the server memory 262 of the server 260. In one embodiment, obtaining surrounding information about the first place 410 from the map database may mean obtaining surrounding information of a specific zone in the map database. The specific zone may be a zone determined by a range set around the first place 410 (e.g., first range 420, second range 430 in FIG. 4). If the set range is 200 m, surrounding information about an area with a radius of 200 m centered on the first place 410 may be obtained. In an embodiment, the set range may be determined according to the location positioning scheme for determining the first place 410. The set range may be determined according to the amount of error of the location positioning scheme. Location positioning through the GPS may be more accurate than location positioning through a communication module. Hence, the set range (e.g., second range 430 in FIG. 4) for a case where the first place 410 is determined through a communication module may be larger than the set range (e.g., first range 420 in FIG. 4) for a case where the first place 410 is determined through the GPS.

According to yet other embodiments, the map database may refer to a set of data representing geographic information. Data included in the map database may include positions and attributes of objects having geographic locations. In another embodiment, data may be stored in various forms such as map data, tabular data and pictorial data. Also, data may be stored in the map database in a vector or raster format. Location information can be output in the form of 3D or two-dimensional (2D) graphics by using data included in the map database. A map database may constitute, for example, a geographic information system.

In an embodiment, the surrounding information may refer to various information stored in the map database. In an example, the surrounding information may include information regarding buildings, roads, signboards and landmarks included in the first place 410. In another embodiment, information about a building may include information regarding external appearances of the building, stores included in the building, points of interest (POIs), floor area ratio, and building coverage ratio. Information about a road may include information regarding the width, lanes, and various signposts of the road. Information about a signboard may include information regarding shapes of the signboard, characters and figures written thereon, and colors thereof. Information about a landmark may include information regarding external appearances and popularity (number of visitors) of the landmark. This information may be categorized and stored on the map database.

The surrounding information described above is only an example of various information that may be obtained through the map database; as the map database may contain 3D modeling data of various objects (e.g. buildings, roads, signboards, geographical features), various types of information may be obtained as surrounding information in addition to the information described above.

According to various embodiments, the processor may generate scan request information by using the obtained surrounding information at operation 330. A reference target may be included in the scan request information. The reference target may correspond to a shooting target to be photographed later by the camera 240 of the electronic device 200. In an embodiment, the processor may display shooting guide so that the shooting target is photographed (operation 340). In another embodiment, the processor may determine second place and second direction by using the reference target and shooting target (operation 350). In yet another embodiment, the processor may display the second place and the second direction on the display (operation 360) according to an affirmative (i.e., yes) of operation 350.

Next, a description will be given of various examples in which the processor analyzes the surrounding information. The operations described below are some examples of various schemes for analyzing the surrounding information; even if the analysis scheme is not described below, it can be understood that the contents that can be derived using information known to those skilled in the art falls within the scope of the disclosure.

In one embodiment, the processor may utilize the density and heights of buildings included in the first place 410. The processor may use surrounding information in the form shown in Table 1. The surrounding information in Table 1 shows various information about a building in a tabular form.

TABLE 1

| Classification | Item name |
|---|---|
| A0 | source drawing ID |
| A1 | GIS integrated building identification number |
| A2 | unique number |
| A3 | legal dong code |
| A4 | legal dong name |
| A5 | lot number |
| A6 | special lot code |
| A7 | special district name |
| A8 | building usage code |
| A9 | building usage name |
| A10 | building structure code |
| A11 | building structure name |
| A12 | building area |
| A13 | usage approval date |

TABLE 1-continued

| Classification | Item name |
|---|---|
| A14 | total floor area |
| A15 | site area |
| A16 | height |
| A17 | building coverage ratio |
| A18 | floor area ratio |
| A19 | building ID |
| A20 | illegal building indication |
| A21 | reference system linked key |
| A22 | reference date |

Table 1 shows an example of surrounding information including building information. In an embodiment, the processor may measure the building density by using building area, total floor area, site area, height, building coverage ratio, and floor area ratio included in the surrounding information. When the building coverage ratio and the floor area ratio satisfy criterion values, it may be determined that the density of buildings included in the first place 410 is high. In another embodiment, when it is determined that the density of buildings is high, the processor may analyze the heights of buildings by using external appearance information of the building included in the surrounding information. Whether the building height satisfies a preset criterion may be identified through various schemes. In an example, the processor may determine whether the height of a building satisfies a preset criterion by using a height index. The height index may mean a value obtained by multiplying the building area and the height together. The representative value of the height index may be determined through various statistical options (e.g., mean value, median value, mode value). When the representative value of the height index satisfies the preset criterion, it may be determined that the height of the building satisfies the preset criterion, and scan request information including the skyline of the building as a reference target may be generated. In another example, when the representative value of the height index is lower than the preset criterion (the height of the building is relatively low), the skyline of the building may be determined as the reference target. The skyline may refer to a boundary line between a building and the sky. When the skyline is determined as the reference target, the processor may retrieve information about the building's skyline from the map database.

In still another embodiment, the processor may use the width of a road included in the first place 410. In an example, the processor may use surrounding information in a form shown in Table 2. The surrounding information of Table 2 represents various information about the road in the form of a table.

TABLE 2

| Serial number | Classification | Geographic feature | Layer name |
|---|---|---|---|
| 1 | transportation | road boundary | plane |
| 2 | | road centerline | line |
| 3 | | sidewalk | |
| 4 | | crosswalk | |
| 5 | | safety zone | |
| 6 | | overpass | |
| 7 | | bridge | |
| 8 | | crossroad | |
| 9 | | flyover roadway | |
| 10 | | interchange | |
| 11 | | tunnel | |

In an embodiment of the disclosure, the processor may calculate a road index by using the surrounding information in Table 2. The road index may mean a value obtained by dividing the area occupied by the road by the total area of the first place 410. The area occupied by the road may be calculated by using the road boundary included in the surrounding information in Table 2. In an embodiment, when the road index satisfies a preset criterion, the processor may generate scan request information including the layout of the road as a reference target. In another embodiment, it is possible to identify whether the road width in road information included in the surrounding information satisfies a preset criterion. A road having eight or more lanes with two-way traffic may be determined as a preset criterion. When there is a road having eight or more lanes with two-way traffic exists among the roads included in the surrounding information, scan request information including the layout of the road as a reference target may be generated. The layout of a road may be information such as the external appearance of the road, a signpost included in the road, and a boundary between the road and a building. In yet another embodiment, the processor may analyze the characteristic of a road (e.g., signpost included in the road, boundary between the road and a building) in the surrounding information. When the characteristic of the road satisfies a preset criterion, the layout of the road may be determined as a reference target. In an example, when the signpost in the road is larger than a preset size or when the dividing line of the boundary between the road and an adjacent building is clear, it may be determined that the characteristic of the road satisfies the preset criterion, and the layout of the road may be determined as a reference target.

According to an embodiment, the processor may use information on a signboard included in the first place 410. According to another embodiment, the processor may compare the signboard information included in the surrounding information with a preset criterion. When the signboard information included in the surrounding information meets the preset criterion, the processor may generate scan request information including the signboard of a building as a reference target. In an example, when the size of a signboard satisfies a preset criterion, scan request information including the signboard as a reference target may be generated. As another example, when the boundaries between characters and figures included in the signboard are clear due to the difference in contrast between the letters and figures and the background, it may be determined that information on the signboard satisfies a preset criterion. When the ratio of the signboard to the exterior of the building exceeds a specific ratio (e.g., 20%), it may be determined that information on the signboard satisfies the preset criterion.

In one embodiment, the processor may use information about a landmark included in the first place 410. In another embodiment, the processor may determine whether a landmark is included in the surrounding information. The landmark may mean, for example, a building having a height of 150 m or more. When a landmark is included in the surrounding information, the processor may generate scan request information including the landmark as a reference target. Only when the number of visitors to a landmark included in the surrounding information exceeds a preset criterion, the processor may generate scan request information including the landmark as a reference target.

Figure 5:
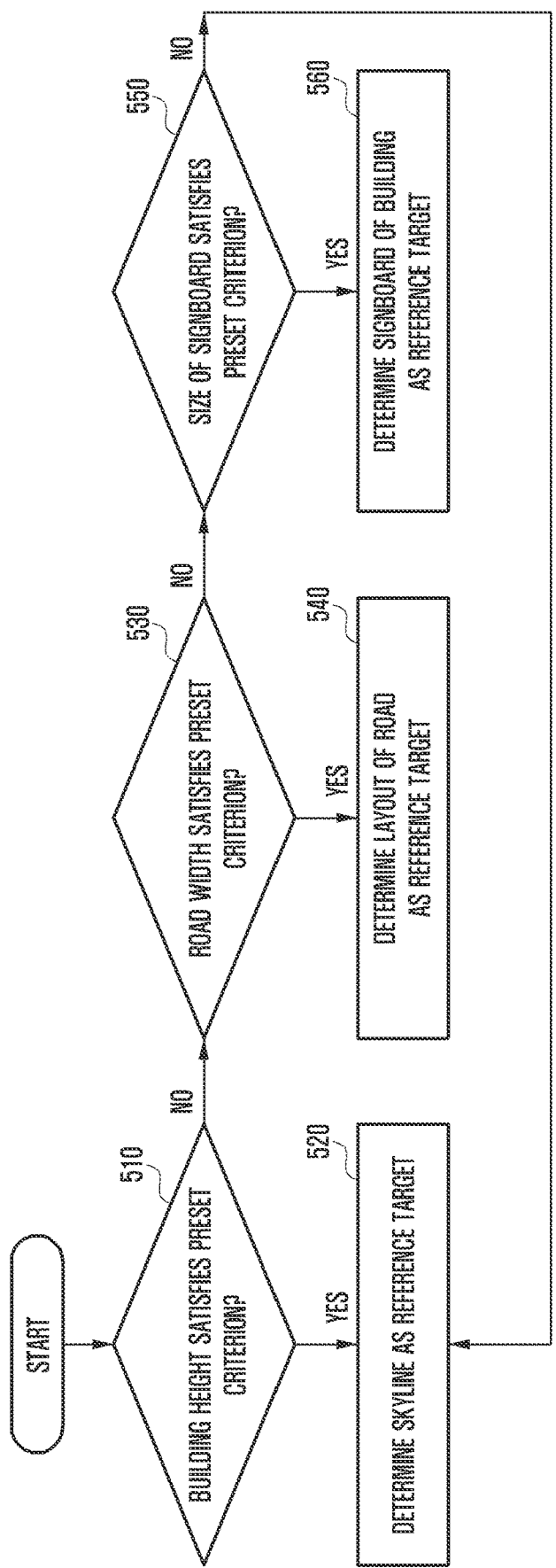
FIG. 5 is a diagram illustrating an algorithm for generating scan request information according to an embodiment of the disclosure.

According to some embodiments, the processor may generate scan request information according to the algorithm shown in FIG. 5.

FIG. 5 is a diagram illustrating an algorithm for generating scan request information according to an embodiment of the disclosure.

In one embodiment, the processor may first check whether the height of a building satisfies a preset criterion (operation 510), and if the preset criterion is satisfied, the processor may determine the skyline of the building as a reference target (operation 520). If the preset criterion is not satisfied, the processor may check whether the width of a road included in the surrounding information satisfies a preset criterion (operation 530). If the width of the road satisfies the preset criterion, the processor may determine the layout of the road as a reference target (operation 540). If the preset criterion is not satisfied, the processor may check whether the size of a signboard satisfies a preset criterion (operation 550). If the size of the signboard satisfies the preset criterion, the processor may determine the signboard as a reference target (operation 560). If the size of the signboard fails to satisfy the preset criterion, the skyline of the building may be determined as a reference target. The order of determination described above is only an example, and scan request information may be generated through various other algorithms. For example, it is also possible to generate scan request information by checking the width of the road first or to generate scan request information by checking signboard information first.

According to some embodiments, the processor may prioritize a plurality of reference targets included in the scan request information. The priority of the reference targets may be determined in various ways. The processor may, for example, determine the priority of reference targets by using past data. The processor may store the reference target, which has been successfully used in the past for determining the second place and second direction, in the memory 220 of the electronic device 200 or the server memory 262 of the server 260 as a preferred reference target. The second place and second direction may refer to the exact location of the electronic device 200 determined through various schemes disclosed in this document. Details of determining the second place and second direction will be described later.

In one embodiment, when the first place 410 is determined, the processor may identify a preferred reference target from the surrounding information close to the corresponding first place 410. In another embodiment, the processor may determine a reference target having a high priority as the preferred reference target. As another example, the processor may perform quantitative evaluation on a plurality of reference targets according to a fuzzy theory, and determine the priority of the reference targets according to the evaluation. The priority of the reference targets set in this way may be included in the scan request information. The priority of the reference targets may be used later when displaying the shooting guide on the display 250.

FIGS. 6A to 6D are diagrams for illustrating a shooting guide according to various embodiments of the disclosure.

According to various embodiments, a processor may display a shooting guide on a display 250 so that a shooting target corresponding to a reference target included in a scan request information may be photographed by a camera 240 of an electronic device 200 (i.e., operation 340). In an embodiment, the shooting guide may refer to letters and figures displayed on the preview screen when an application related to the camera 240 is run.

FIG. 6A is a diagram for explaining the shooting guide when the reference target is a building skyline according to an embodiment of the disclosure.

In one embodiment, when the reference target is the skyline of a building, the shooting target may be a boundary between the building and the sky. The shooting guide may be a phrase 610A such as "Please take a picture of the boundary between the building and the sky". In another embodiment, the processor may analyze the image being captured by the camera 240 in real time to determine whether the boundary between the building and the sky is properly captured. In yet another embodiment, when the angle of the electronic device 200 is changed to increase the proportion of the building in the currently photographed image, the processor may display a shooting guide 620A of an up arrow to guide the user to photograph the building and the sky at an appropriate ratio. Also, it may display a shooting guide 630A inducing a specific mark to appear in the center of the screen. The shooting target may be photographed in the form of a still image, a panoramic image, or a moving image. In an example, when the shooting target is photographed in the form of a moving image, the processor may display a shooting guide 640A of an arrow-shape according to a location to which the electronic device 200 is to be moved.

FIG. 6B is a diagram for explaining the shooting guide when the reference target is the layout of a road according to an embodiment of the disclosure.

In one embodiment, when the reference target is the layout of a road, the shooting target may be the corresponding road. The shooting guide may be a phrase 610B such as "Please take a picture so that the road comes to the center of the screen". Additionally, to obtain the characteristics of the road, the processor may display a phrase 620B such as "Please take a picture so that the road signpost can be clearly seen" as a shooting guide. In another embodiment, the processor may analyze the captured image in real time, and when only a part of the road to be captured is being photographed, the processor may induce the user to photograph the entire road by displaying an arrow-shaped shooting guide 630B so that the entire road may be captured. The shooting target may be photographed in the form of a still image, a panoramic image, or a moving image. When the shooting target is photographed in the form of a moving image, the processor may display a shooting guide of an arrow-shape according to a location to which the electronic device 200 is to be moved. When using a road and the shape of a building adjacent to the road, a phrase 640B such as "Please take a picture so that the road and the building appear on one screen" may be displayed as a shooting guide.

Figure 6C:
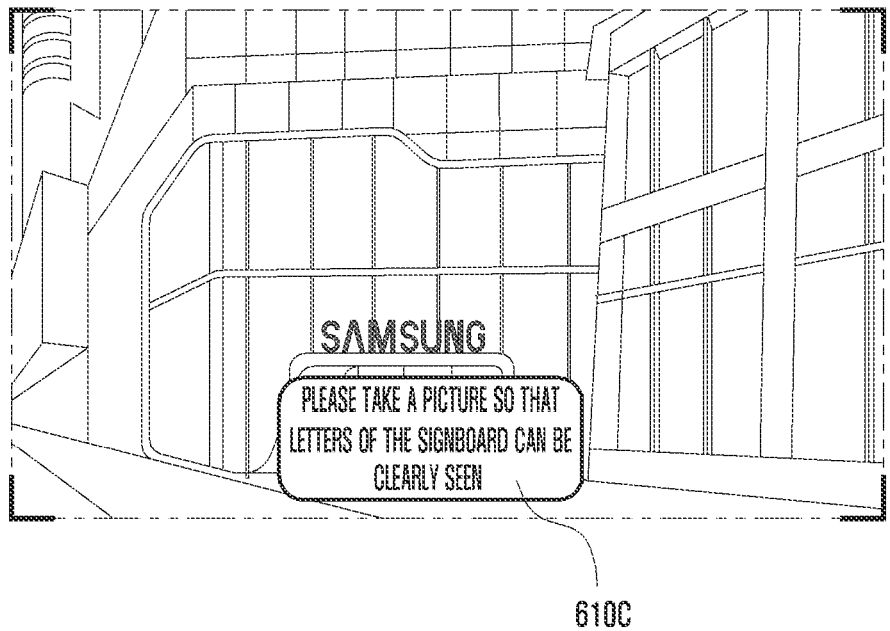

FIG. 6C is a diagram for explaining the shooting guide when the reference target is a signboard of a building according to an embodiment of the disclosure.

According to an embodiment, when the reference target is a signboard of a building, the shooting target may be the corresponding signboard. The shooting guide may be a phrase 610C such as "Please take a picture so that letters of the signboard can be clearly seen". According to another embodiment, the processor may analyze the image being photographed in real time, and when only a part of the signboard of the building to be captured is being photographed, the processor may induce the user to photograph the entire signboard by displaying a shooting guide of an arrow shape so that the entire signboard may be photographed.

Figure 6D:
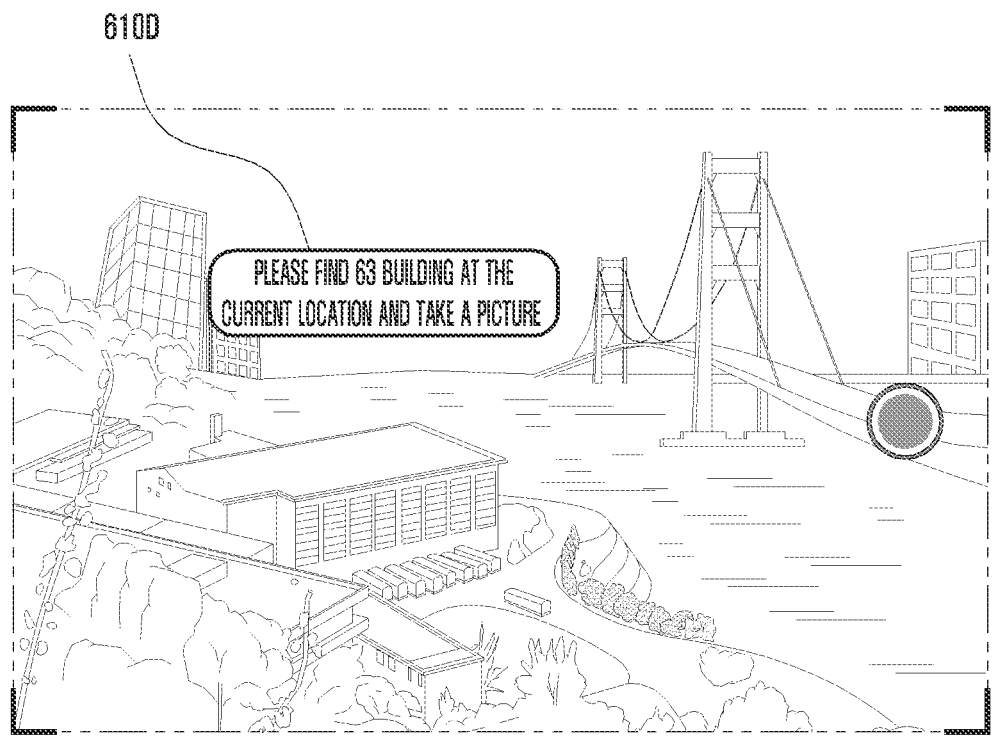

FIG. 6D is a diagram for explaining the shooting guide when the reference target is a landmark according to an embodiment of the disclosure.

In an embodiment of the disclosure, when the reference target is a landmark, the shooting target may be the corresponding landmark. In an example, when the reference target is "63 Building", the shooting guide may be a phrase 610D such as "Please find 63 Building at the current location and take a picture". In another embodiment of the disclosure, the processor may analyze the image being captured in real time, and when only a part of the landmark to be captured is being photographed, the processor may induce the user to photograph the entire landmark by displaying a shooting guide of an arrow shape so that the overall appearance of the landmark may be photographed.

According to various embodiments, the shooting guide may be at least one point to be photographed by the user. The user may take a picture by adjusting the electronic device 200 so that the shooting guide comes to the center of the screen.

According to other embodiments, the shooting guide may be displayed according to the priority information of the reference target included in the scan request information. The processor may display the shooting guide so that the shooting target corresponding to a reference target having a high priority is photographed first. In the case where the second place is not successfully determined even when the shooting target corresponding to a reference target having a high priority is photographed, the processor may display the shooting guide so that the shooting target corresponding to a reference target having a next higher priority is photographed. For example, it is possible to identify the similarity between the reference target and the shooting target by numerically comparing the reference target having a high priority and the shooting target. As a result of the comparison, if the numerical value does not satisfy a preset value, it may be regarded as not succeeding in determining the second place, and the shooting guide may be displayed so that the shooting target corresponding to a reference target having a next higher priority is photographed.

In addition to the above-described shooting guides, various shooting guides may be displayed so that the user may photograph a shooting target corresponding to the reference target through the camera 240 of the electronic device 200.

According to yet other embodiments, the processor may use a plurality of shooting targets when there are multiple shooting targets in the image currently being shot. For example, when the skyline of a building and the signboard of the building are simultaneously present in the image being captured, the second place may be determined by comparing the skyline, the signboard of the building and the shooting target included in the scan request information.

According to still other embodiments, when the second place can be determined by using the photographed shooting target and the reference target, the processor may display a notification on the display 250 to stop photographing.

Figure 7:
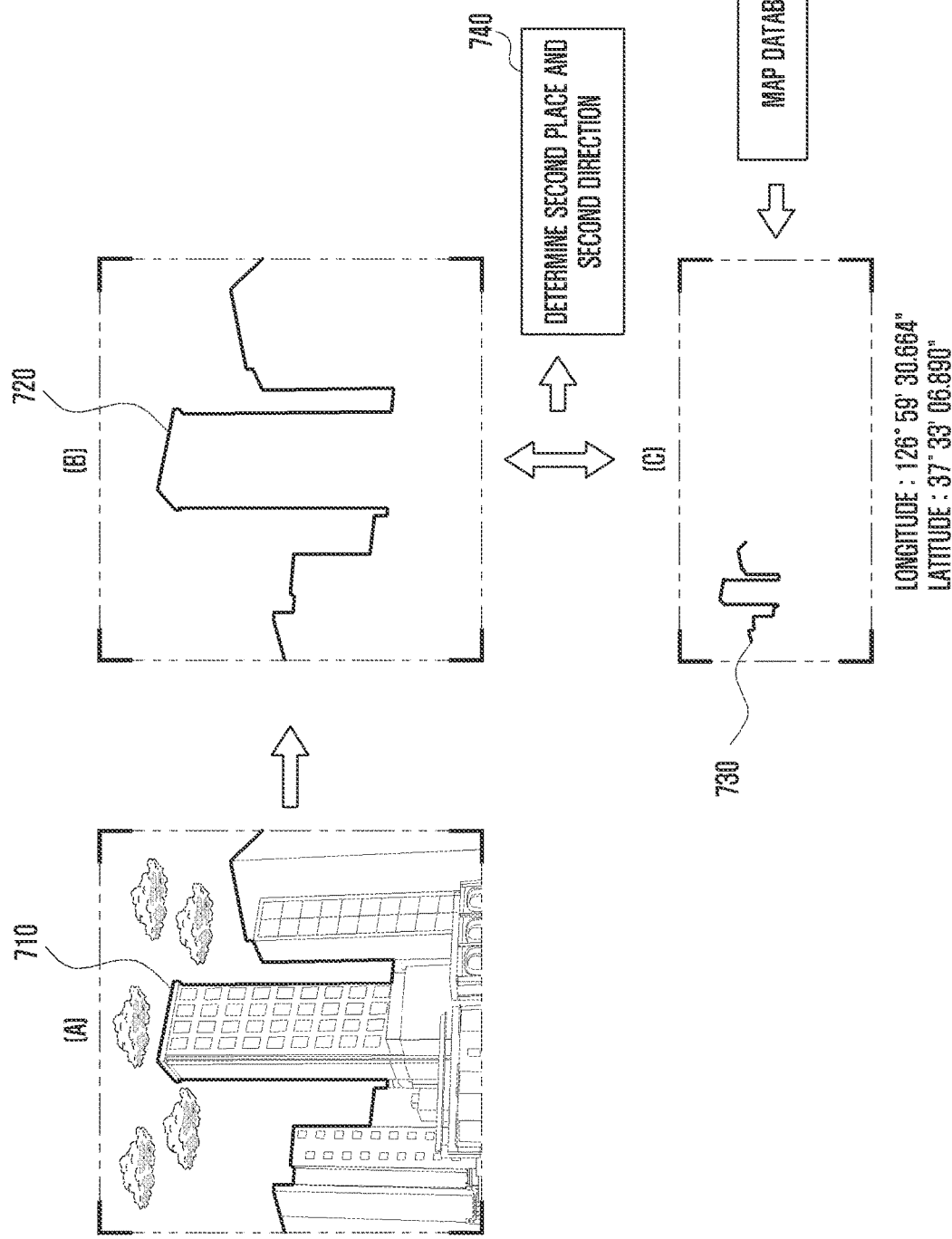
FIG. 7 is a diagram for explaining a scheme of determining a second place and a second direction by using a shooting target and a reference target according to an embodiment of the disclosure.

FIG. 7 is a diagram for explaining a scheme of determining a second place and a second direction by using a shooting target and a reference target according to an embodiment of the disclosure.

According to some embodiments, the processor may determine a second place and a second direction by using the shooting target and the reference target (i.e., operation 350).

Referring to FIG. 7, a processor may extract a feature image 720 from a shooting target 710. The feature image 720 may be extracted by applying an image analysis technique to the captured image (i.e., shooting target 710). As shown in FIG. 7, to extract a skyline (i.e., shooting target 710) of a building as a feature image 720, the feature image 720 may be extracted by applying image convolution capable of extracting the boundary between a sky section and the building to the captured image (i.e., shooting target 710). The feature image 720 extracted in this way may be matched to a reference target 730. The processor may transform the extracted feature image 720 and match it to the reference target 730. The processor may determine a location (e.g., latitude and longitude in FIG. 7) of the matched reference target 730 from a map database, and may determine the second place and the second direction (operation 740) through the result of comparison between the reference target 730 and the feature image 720.

In one embodiment, the processor may determine a relative position and direction of the electronic device 200 with respect to the shooting target by using internal information of the camera 240 (focal length, principal point, skew coefficient of camera 240). In another embodiment, the internal information of the camera is fixed according to the camera 240 included in the electronic device 200. Through this internal information, the processor may calculate the distance and angle between the shooting target and the camera 240 by using a technique of projecting the shooting target on the coordinate system of the camera 240. Calculating the relative position and relative angle between the shooting target and the camera 240 by using internal information of the camera 240 may be performed through various algorithms widely known in the art. In yet another embodiment, the processor may determine the second place and the second direction by applying the previously calculated relative position and relative angle to the reference target matching the shooting target. The location of the reference target may be accurately specified through the map database. If the relative position and relative angle of the electronic device 200 with respect to the reference target are known, the location of the electronic device 200 may be determined from the location of the reference target.

In one embodiment, the processor may determine the second place and second direction of the electronic device 200 by using 3D modeling of the map database. In another embodiment, the processor may simulate a point where an image of the shooting target can be obtained in a virtual space formed by 3D modeling. For example, it may be simulated in a virtual space that an image of the shooting target can be obtained when the reference target is photographed at a point 20 m east of the shooting target. The second place may be determined as a point 20 m away from the reference object, and the second direction may be determined as west. Here, feature points of the shooting target may be extracted. Feature points of the shooting target may be extracted through an image convolution operation. In addition, the internal information of the camera 240 may be used for simulation.

In the case of FIG. 7, for convenience of description, data in image formats of feature image 720 and reference target 730 are compared, but the processor may determine the second place and second direction (operation 740) through numerical analysis. In an example, the processor may use feature points or hash values extracted from the shooting target 710. The data of a comparison target corresponding to the shooting target 710 may be a collection of hash values of the comparison target photographed according to various positions and directions within a virtual 3D city model. In an embodiment, the processor may compare the hash value extracted from the shooting target 710 with a collection of hash values of the comparison target photographed in various positions and directions in the virtual city model. In another embodiment, the processor may find a hash value most similar to the hash value of the shooting target 710 from among the collection of hash values of the comparison target, and may determine the second place and second direction (operation 740) by using the shooting location and direction of the comparison target where that hash value is obtained.

The second place and second direction may be determined based on the reference target and the shooting target by utilizing various other image analysis techniques.

According to some embodiments, if the processor fails to determine the second place, it may return to shooting guide display at operation 340 to photograph the shooting target again.

Figure 8:
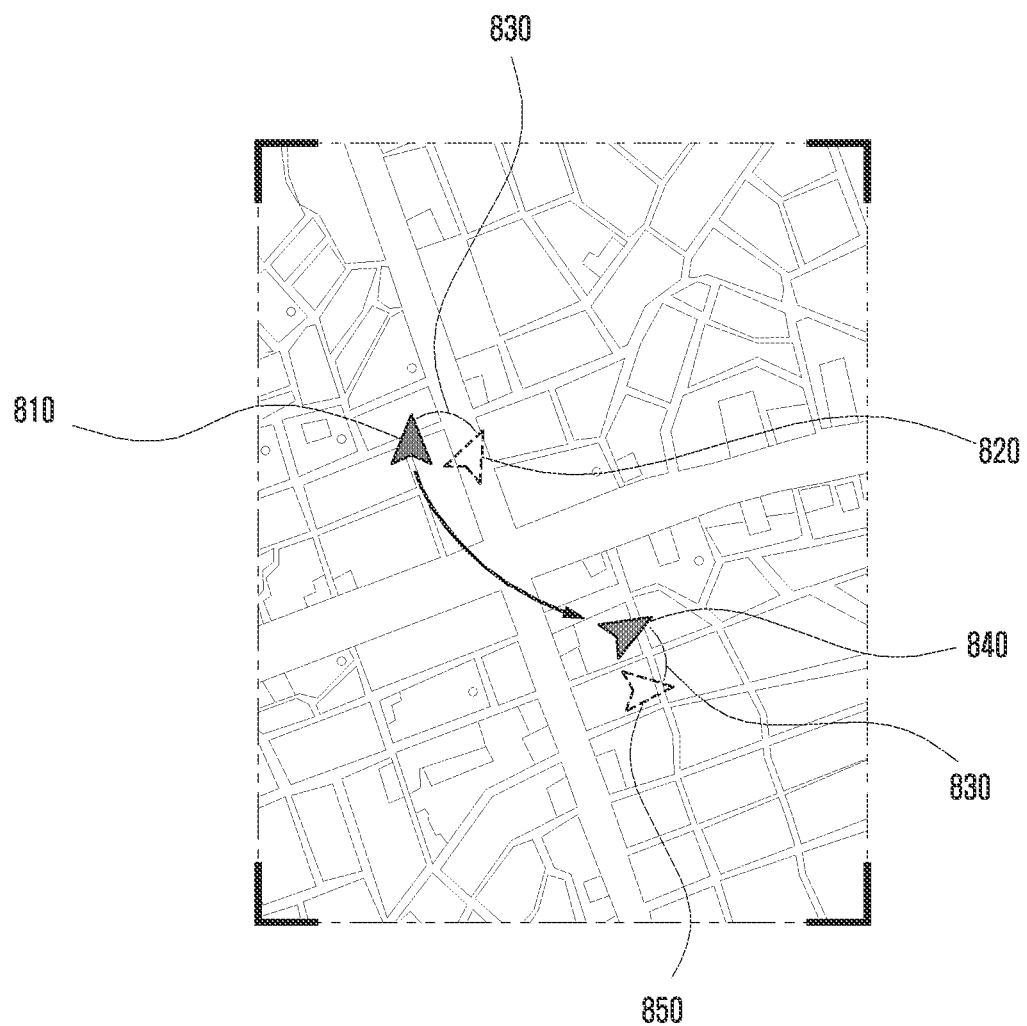
FIG. 8 is a diagram for explaining a scheme of determining a user's location by using an offset according to an embodiment of the disclosure.

FIG. 8 is a diagram for explaining a scheme of determining a user's location by using an offset according to an embodiment of the disclosure.

Figure 9:
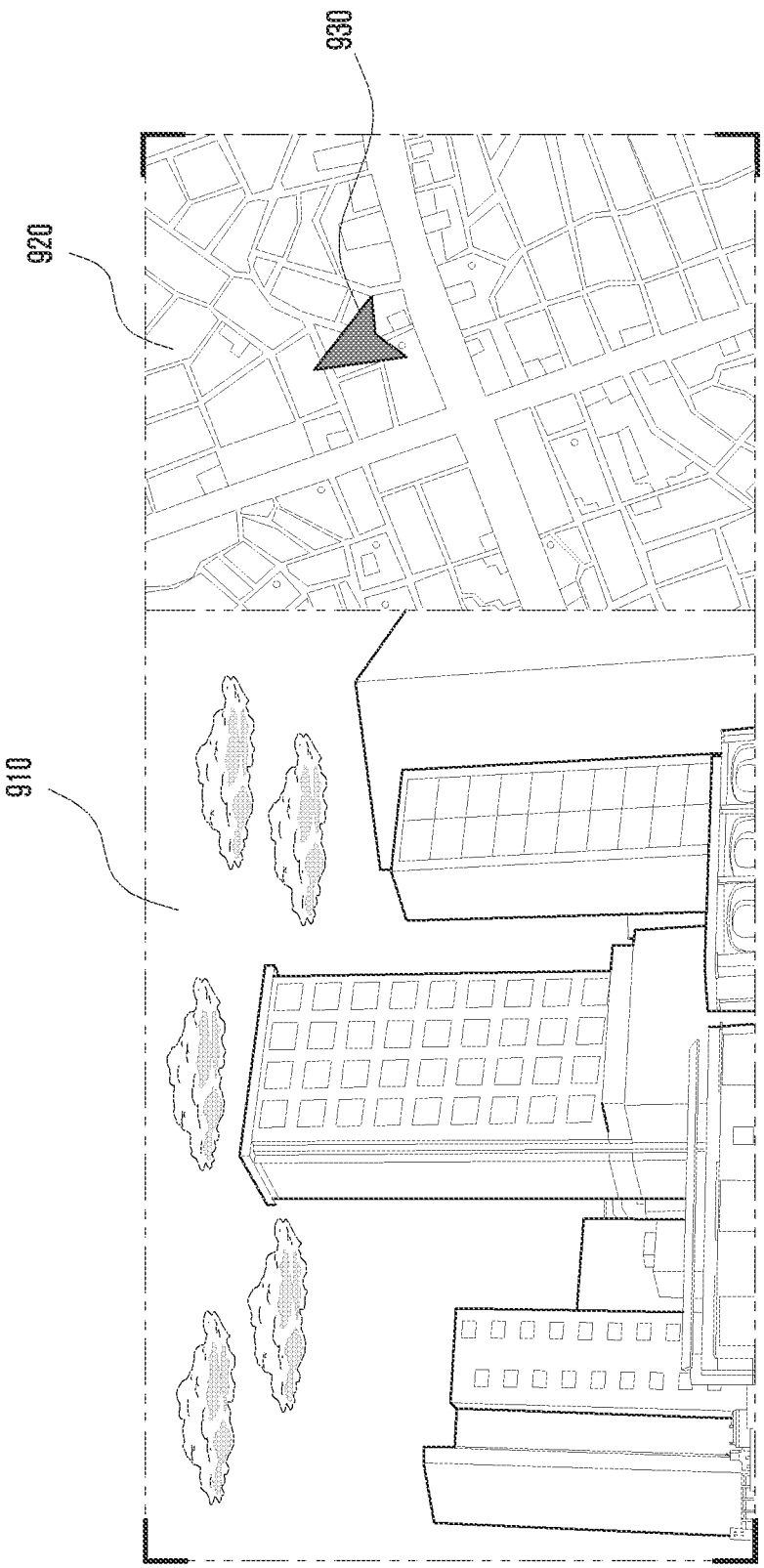
FIG. 9 is a diagram illustrating a state in which a second place and a second direction are displayed on a display according to an embodiment of the disclosure.

FIG. 9 is a diagram illustrating a state in which a second place and a second direction are displayed on the display according to an embodiment of the disclosure.

According to various embodiments, the processor may set the difference between a first place 810 and a second place 820 and the difference between a first direction of the first place 810 and a second direction of the second place 820 as an offset 830 by using the reference target and the shooting target. In case that a user moves, a motion detection sensor included in a location positioning module 230 may estimate the movement of an electronic device 200 to measure a third place 840 and a third direction of the third place 840. The processor may determine a fourth place 850 and a fourth direction of the fourth place 850 by applying the offset 830 to the third place 840 and the third direction of the third place 840. When the offset 830 is set, the location and direction of the electronic device 200 may be relatively accurately measured for a specific period of time even if the electronic device 200 is moved from the measurement point.

According to some embodiments, the processor may display the second place and second direction on the display 250. For example, the processor may simultaneously display, on the display 250, a preview screen 910 of the camera 240 and a map screen 920 on which a second place 930 and second direction of the second place 930 are indicated.

An electronic device according to the various embodiments disclosed in this document may include: a camera; a display; a memory; a location positioning module for measuring the location and direction of the electronic device; and a processor operably connected to the camera, display, memory, and location positioning module, wherein the processor may be configured to: determine a first place and first direction of a user through the location positioning module; obtain surrounding information about the first place from a map database; generate scan request information including a reference target from the map database based on the surrounding information; display a shooting guide on the display by using the scan request information so that a shooting target corresponding to the reference target is photographed by the camera; determine a second place and second direction by using the shooting target and the reference target; and display the second place and second direction on the display.

Further, the surrounding information may be information from the map database included in a range set around the first place, and the set range may be determined according to a location positioning technique for determining the first place.

Still further, the processor may be configured to: determine priorities of plural reference targets included in the scan request information; display a shooting guide on the display so that a shooting target corresponding to a reference target having the highest priority is photographed; and display, in response to a failure of determining the second place, a shooting guide on the display in sequence according to the priority order.

In addition, the processor may be configured to: store, as a preferred reference target, a reference target used when the second place and second direction are successfully determined in the memory; and determine, when the preferred reference target is included in the plural reference targets, the priority of the preferred reference target to be high.

Further, the surrounding information may include information regarding at least one of a building, a road, a signboard, or a landmark included in the first place.

Still further, the reference target may include at least one of a boundary between a building and the sky (skyline), a layout of a road, a signboard of a building, or a landmark.

In an embodiment, the processor may be configured to: compare the height of a building included in the first place with a preset criterion by analyzing the surrounding information; and generate scan request information including the skyline as a reference target based on the comparison.

Additionally, the processor may be configured to: compare the width of a road included in the first place with a preset criterion by analyzing the surrounding information; and generate scan request information including the layout of the road as a reference target based on the comparison.

Further, the processor may be configured to: identify whether there is a landmark included in the first place by analyzing the surrounding information; and generate scan request information including the landmark as a reference target based on the identification.

In another embodiment, the processor may be configured to: compare the brightness and darkness of a signboard included in the first place with a preset criterion by analyzing the surrounding information; and generate scan request information including the signboard of the building as a reference target based on the comparison.

The processor may be configured to: determine a relative position and relative direction of the electronic device with respect to the shooting target by using internal information of the camera including focal length, principal point, and skew coefficient; and determine the second place and second direction by applying the relative position and relative direction to the reference target.

In yet another embodiment, the processor may be configured to display the shooting guide by comparing an image being captured by the camera and the reference target in real time.

In addition, the processor may be configured to: determine an offset by using the reference target and the shooting target; and determine the second place and second direction by applying the offset to the first place and first direction.

A server according to various embodiments disclosed in this document may include: a server memory; and a server processor, wherein the server processor may be configured to: receive a first place from an electronic device to obtain surrounding information about the first place from a map database stored in the server memory; generate scan request information including a reference target from the map database based on the surrounding information; transmit the scan request information to the electronic device so as to enable the electronic device to photograph a shooting target corresponding to the reference target by use of the scan request information; receive the shooting target from the electronic device to determine a second place and second direction by using the shooting target and the reference target; and transmit the second place and second direction to the electronic device.

Further, the server processor may be configured to determine priorities of plural reference targets included in the scan request information.

In an embodiment, the server processor may be configured to: store, as a preferred reference target, a reference target used when the second place and second direction are successfully determined in the server memory; and determine, when the preferred reference target is included in the plural reference targets, the priority of the preferred reference target to be high.

In another embodiment, the surrounding information may include information regarding at least one of a building, a road, a signboard, or a landmark included in the first place.

In yet another embodiment, the reference target may include at least one of a boundary between a building and the sky (skyline), a layout of a road, a signboard of a building, or a landmark.

Further, the server processor may be configured to: compare the height of a building included in the first place with a preset criterion by analyzing the surrounding information; and generate scan request information including the skyline as a reference target based on the comparison.

In addition, the server processor may be configured to: determine an offset by using the reference target and the shooting target; and determine the second place and second direction by applying the offset to the first place and first direction.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a display;
   memory storing instructions;
   location positioning circuitry configured to measure a location and a direction of the electronic device; and
   one or more processors operably connected to the camera, the display, the memory, and the location positioning circuitry,
   wherein the instructions, when executed by the one or more processors individually or collectively, cause the electronic device to:
   determine a first place and first direction of a user through the location positioning circuitry,
   obtain surrounding information about the first place from a map database,
   generate scan request information including a reference target from the map database based on the surrounding information,
   display a shooting guide on the display by using the scan request information so as to guide a user of the electronic device to photograph a shooting target corresponding to the reference target using the camera,
   extract a feature from the shooting target,
   determine a relative place and a relative direction from the shooting target,
   match the feature to the reference target,
   determine a location of the reference target comprising a place and a direction of the reference target from the map database, determine a modified geographic place and modified geographic direction based on the location of the reference target, the relative place and the relative direction, and display the modified geographic place and modified geographic direction on the display.

2. The electronic device of claim 1, wherein the surrounding information is information from the map database included in a range set around the first place, and wherein the range set is determined according to a location positioning technique for determining the first place.

3. The electronic device of claim 1, wherein the instructions, when executed by the one or more processors individually or collectively, further cause the electronic device to:

determine priorities of plural reference targets included in the scan request information, display the shooting guide on the display so as to guide a user of the electronic device to photograph the shooting target corresponding to a reference target having the highest priority to be photographed, and display, in response to a failure of determining the modified geographic place, the shooting guide on the display in sequence according to a priority order.

4. The electronic device of claim 3, wherein the instructions, when executed by the one or more processors individually or collectively, further cause the electronic device to:

store, as a preferred reference target, a reference target used when the modified geographic place and modified geographic direction are successfully determined in the memory, and determine, in case that the preferred reference target is included in the plural reference targets, the priority of the preferred reference target to be high.

5. The electronic device of claim 1, wherein the surrounding information includes information regarding at least one of a building, a road, a signboard, or a landmark included in the first place.

6. The electronic device of claim 5, wherein the reference target includes at least one of a boundary between a building and a skyline, a layout of a road, a signboard of a building, or a landmark.

7. The electronic device of claim 6, wherein the instructions, when executed by the one or more processors individually or collectively, further cause the electronic device to:

compare a height of a building included in the first place with a preset criterion by analyzing the surrounding information, and generate scan request information including the skyline as a reference target based on the comparison.

8. The electronic device of claim 6, wherein the instructions, when executed by the one or more processors individually or collectively, further cause the electronic device to:

compare a width of a road included in the first place with a preset criterion by analyzing the surrounding information, and generate scan request information including a layout of the road as a reference target based on the comparison.

9. The electronic device of claim 6, wherein the instructions, when executed by the one or more processors individually or collectively, further cause the electronic device to:

identify whether there is a landmark included in the first place by analyzing the surrounding information, and generate scan request information including the landmark as a reference target based on the identification.

10. The electronic device of claim 6, wherein the instructions, when executed by the one or more processors individually or collectively, further cause the electronic device to:

compare brightness and darkness of a signboard included in the first place with a preset criterion by analyzing the surrounding information, and generate scan request information including the signboard of the building as a reference target based on the comparison.

11. The electronic device of claim 1, wherein the instructions, when executed by the one or more processors individually or collectively, further cause the electronic device to:

determine a relative position and relative direction of the electronic device with respect to the shooting target by using internal information of the camera including focal length, principal point, and skew coefficient, and determine the modified geographic place and modified geographic direction by applying the relative position and relative direction to the reference target.

12. The electronic device of claim 1, wherein the instructions, when executed by the one or more processors individually or collectively, further cause the electronic device to:

display the shooting guide by comparing an image being captured by the camera and the reference target in real time.

13. A server comprising:

a server memory storing instructions; and one or more server processors, wherein the instructions, when executed by the one or more server processors individually or collectively, cause the server to:

receive a first place from an electronic device to obtain surrounding information about the first place from a map database stored in the server memory, generate scan request information including a reference target from the map database based on the surrounding information, transmit the scan request information to the electronic device so as to enable the electronic device to photograph a shooting target corresponding to the reference target by use of the scan request information, receive the shooting target from the electronic device, extract a feature from the shooting target, determine a relative place and a relative direction between the electronic device and the shooting target, match the feature to the reference target, determine a location of the reference target comprising a place and a direction of the reference target from the map database, determine a modified geographic place and modified geographic direction based on the location of the reference target, the relative place and the relative direction, and transmit the modified geographic place and modified geographic direction to the electronic device.

14. The server of claim 13,
wherein the surrounding information includes information regarding at least one of a building, a road, a signboard, or a landmark included in the first place,
wherein the reference target includes at least one of a boundary between a building and a skyline, a layout of a road, a signboard of a building, or a landmark.

\* \* \* \* \*